US011158007B2

(12) United States Patent
Fox et al.

(10) Patent No.: US 11,158,007 B2
(45) Date of Patent: Oct. 26, 2021

(54) DYNAMIC ENERGY CONSUMPTION AND HARVESTING WITH FEEDBACK

(71) Applicant: International Business Machines Corporation, Armonk, NY (US)

(72) Inventors: Jeremy R. Fox, Georgetown, TX (US); Kelley Anders, East New Market, MD (US); Liam S. Harpur, Dublin (IE); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/100,324

(22) Filed: Aug. 10, 2018

(65) Prior Publication Data
US 2020/0051182 A1 Feb. 13, 2020

(51) Int. Cl.
*G06Q 50/06* (2012.01)
*H04L 29/08* (2006.01)
(Continued)

(52) U.S. Cl.
CPC ............. *G06Q 50/06* (2013.01); *G05B 15/02* (2013.01); *H02J 3/381* (2013.01); *H04L 67/12* (2013.01);
(Continued)

(58) Field of Classification Search
CPC .... G06Q 50/06; H02J 3/381; H02J 2003/007; H04L 67/12; H04W 4/021; G05B 15/02; G05F 1/66
(Continued)

(56) References Cited

U.S. PATENT DOCUMENTS 8,417,391 B1 * 4/2013 Rombouts .............. G05B 13/02
700/291
8,600,571 B2 12/2013 Dillon et al.
(Continued)

FOREIGN PATENT DOCUMENTS

EP 3343496 A1 * 4/2018 ............. G06Q 50/06
KR 2010-0062038 A * 12/2008 ............. G06Q 50/06

OTHER PUBLICATIONS https://en.wikipedia.org/wiki/Crowdsourcing, accessed Aug. 9, 2018.
(Continued)

*Primary Examiner* — Rocio Del Mar Perez-Velez
*Assistant Examiner* — Alicia M. Choi
(74) *Attorney, Agent, or Firm* — Anthony Curro; Edell, Shapiro & Finnan, LLC

(57) ABSTRACT

According to embodiments of the present invention, techniques are provided for producing energy from one or more energy production sources. Energy consumption and energy production sources for an entity in a geographic location are analyzed. Sensor data based on the analysis of the entity is collected, wherein the sensor data includes crowdsourced sensor data. A model is generated based on the collected sensor data and the analysis of the entity, wherein the model includes optimization criteria for energy production. The model is utilized to determine an energy production source and energy production for the entity. Occurrence of a triggering event is detected, and the energy production source is adjusted based on the detected triggering event. The model is updated based on newly collected sensor data.

16 Claims, 7 Drawing Sheets

(51) Int. Cl.
*H02J 3/38* (2006.01)
*H04W 4/021* (2018.01)
*G05B 15/02* (2006.01)

(52) U.S. Cl.
CPC ......... *H04W 4/021* (2013.01); *H02J 2203/20* (2020.01)

(58) Field of Classification Search
USPC .......................................................... 700/286
See application file for complete search history.

(56) References Cited

U.S. PATENT DOCUMENTS

| | | | | |
|---|---|---|---|---|
| 2003/0036820 | A1* | 2/2003 | Yellepeddy | G05B 19/042 700/291 |
| 2009/0066357 | A1* | 3/2009 | Fornage | H02J 3/383 324/764.01 |
| 2009/0076790 | A1* | 3/2009 | Fein | G01R 21/01 703/18 |
| 2011/0208365 | A1* | 8/2011 | Miller | G06Q 50/06 700/291 |
| 2012/0173444 | A1 | 7/2012 | Zik | |
| 2015/0143806 | A1 | 5/2015 | Friesth | |
| 2016/0187910 | A1* | 6/2016 | Moreno | G05B 15/02 700/297 |
| 2016/0322835 | A1* | 11/2016 | Carlson | G05F 1/67 |
| 2016/0379147 | A1* | 12/2016 | Stanlake | G06Q 10/06 705/7.23 |
| 2017/0271877 | A1* | 9/2017 | Stewart | H02J 3/383 |
| 2017/0285586 | A1 | 10/2017 | Bharti et al. | |
| 2017/0288455 | A1* | 10/2017 | Fife | G05B 13/048 |
| 2018/0116070 | A1 | 4/2018 | Broadbent et al. | |
| 2018/0269689 | A1* | 9/2018 | Rodriguez | H02J 3/46 |
| 2019/0007912 | A1* | 1/2019 | Do | H04W 56/001 |
| 2020/0213006 | A1* | 7/2020 | Graham | H04L 12/18 |

OTHER PUBLICATIONS https://www.eia.gov/energyexplained/?page=us_energy_transportation, accessed Aug. 9, 2018.

\* cited by examiner

DYNAMIC ENERGY CONSUMPTION AND HARVESTING WITH FEEDBACK

BACKGROUND

1. Technical Field

Present invention embodiments relate to energy management, and more specifically, to techniques for optimizing energy generation, usage and distribution.

2. Discussion of the Related Art

Energy usage continues to grow globally. Although newer production sources of energy, such as solar, wind, geothermal, etc., continue to be adopted, there is not a systematic method to select a particular type of energy sources using energy usage models.

While energy companies strive to develop and deliver repeatable optimal energy sources for all consumers, implementing optimized production and delivery of energy remains difficult. Energy demands may vary for different locations and different needs, and thus, identifying optimal sources of energy production for a location often involves complex analysis. Currently, to optimize an energy demand, the demand is investigated and a trial and error approach is used to identify a solution for each individual scenario. Often, such investigations are time consuming and manually intensive. Additionally, these approaches may not identify optimal energy production sources to produce and distribute energy, as the complexity of the situation may not be adequately considered.

SUMMARY

According to embodiments of the present invention, techniques are provided for producing energy from one or more energy production sources. Energy consumption and energy production sources for an entity in a geographic location are analyzed. Sensor data based on the analysis of the entity is collected, wherein the sensor data includes crowdsourced sensor data. A model is generated based on the collected sensor data and the analysis of the entity, wherein the model includes optimization criteria for energy production. The model is utilized to determine an energy production source and energy production for the entity. Occurrence of a triggering event is detected, and the energy production source is adjusted based on the detected triggering event. The model is updated based on newly collected sensor data.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

DETAILED DESCRIPTION

The present techniques provide dynamically responsive and optimal options for sources of energy production specific to a particular situation, such as a geographical location, consumption requirements, etc., while considering external factors that may impact energy usage, such as weather, atmospheric conditions, power outages, etc. Such systems allow a user to determine optimal sources of energy, often renewable, as well as harvesting and distribution of energy, based on geographic location.

Figure 1:
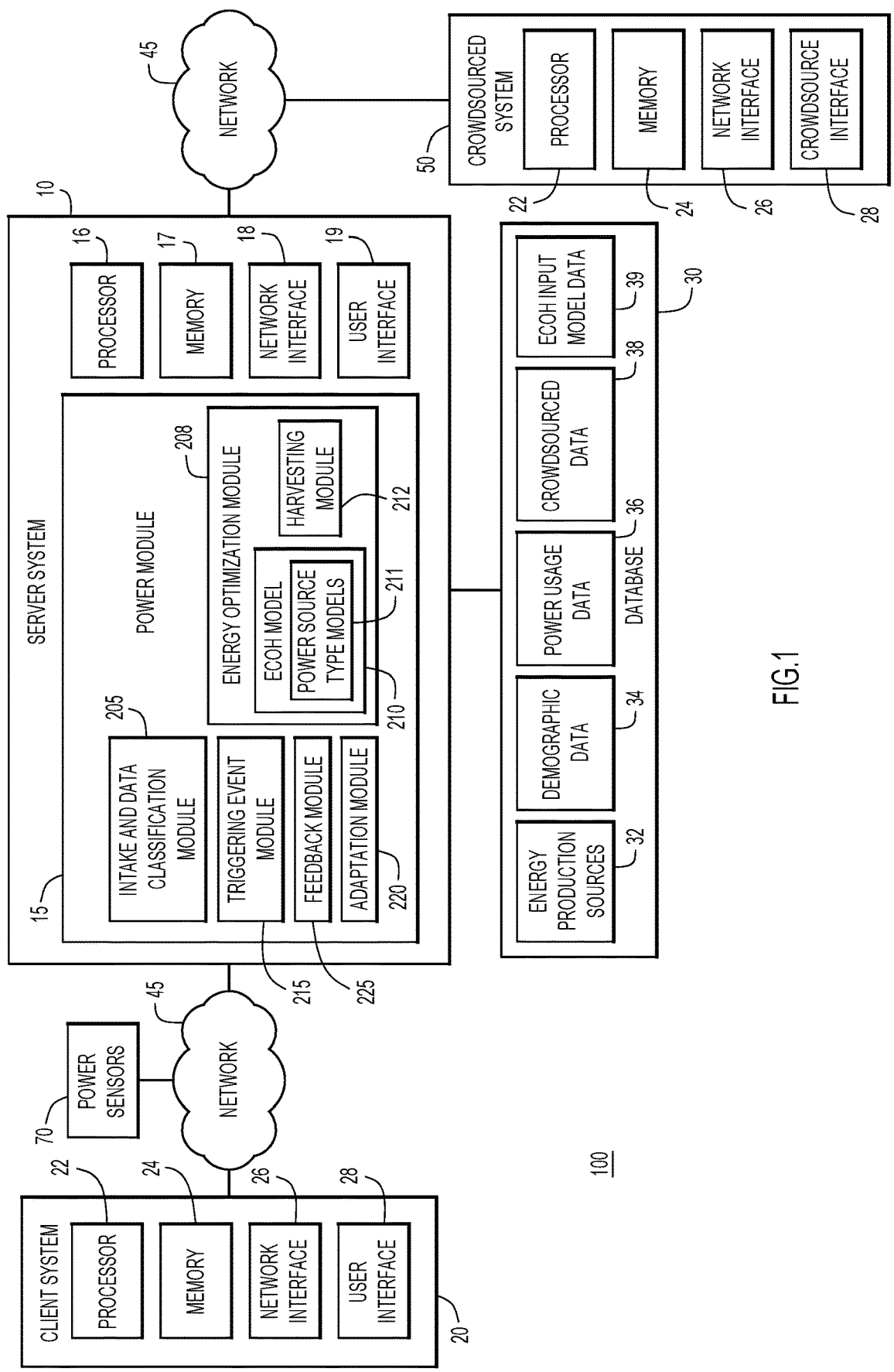
FIG. 1 is a block diagram of an example computing environment for energy production and consumption in accordance with embodiments of the present disclosure.

An example environment for use with present invention embodiments is illustrated in FIG. 1. Specifically, the environment includes one or more server systems 10, one or more client or end-user systems 20, and one or more crowdsourced systems 50. Server systems 10, client systems 20, and crowdsourced system 50 may be remote from each other and communicate over a network 45. The network may be implemented by any number of any suitable communications media, such as wide area network (WAN), local area network (LAN), Internet, Intranet, etc. Alternatively, server systems 10 and client systems 20 may be local to each other, and communicate via any appropriate local communication medium, such as local area network (LAN), hardwire, wireless link, Intranet, etc.

Client systems 20 enable users to submit requests, such as requests to identify optimal energy production sources for an entity at a geographical location, etc. to server systems 10. The server systems 10 include a power module 15 to determine optimal energy production sources for an entity at a geographic location based on sensor data from power sensors 70 and from crowdsourced data from crowdsourced system 50. A database 30 may store various information for the analysis, such as energy production sources 32, demographic data 34, power usage data 36, crowdsourced data 38, ECOH input model data 39, etc. The database system may be implemented by any conventional or other database or storage unit, may be local to or remote from server systems 10 and client systems 20, may be remote from crowdsourced system 50, and may communicate via any appropriate communication medium, such as local area network (LAN), wide area network (WAN), Internet, hardwire, wireless link, Intranet, etc. The client systems may present a graphical user, such as a GUI, etc., or other interface, such as command line prompts, menu screens, etc., to solicit information from users pertaining to the desired queries and analysis, and may provide reports including analysis results, such as power usage for an entity, projected power usage for an entity, optimal energy production sources, etc.

Server systems 10, client systems 20, and crowdsourced system 50 may be implemented by any conventional or other computer systems preferably equipped with a display or monitor, a base, optional input devices, such as, a keyboard, mouse or other input device, and any commercially available and custom software, such as server/communications software, power module software, browser/interface software, etc. By way of example, the base includes at least one processor 16, 22, one or more memories 17, 24 and/or internal or external network interfaces or communications devices 18, 26, such as a modem, network cards, etc. The optional input devices may include a keyboard, mouse or other input device. Crowdsourced system 50 may also provide an interface, crowdsource interface 28, for a user to provide crowdsourced information regarding power usage and/or power generation to power module 15.

Power sensors 70 may be deployed throughout a region or geographical area to provide power usage and power generation information at various locations. For example, power sensors 70 may be deployed at residences, businesses, campuses, as part of utility infrastructure, and so forth. In some cases, the power sensors 70 are directly connected to the network. In other cases, power data from the sensors 70 may be obtained by a member of the crowdsourcing population, and the power data may be provided via the web or other application. The power data from power sensors 70 may be used to determine predicted power generation for energy production sources, used in power source type models, and for predicting power usage for an entity as described in further detail below.

Alternatively, one or more client systems 20 may identify optimal energy production sources for an entity at a geographical location. In this mode of operation, the client system stores or has access to the data, such as energy production sources 32, demographic data 34, power usage data 36, crowdsourced data 38, ECOH input model data 39 and includes power module 15 to identify optimal energy production sources. The graphical user or other interface 19, 28, such as a GUI, command line prompts, menu screens, etc., solicits information from a corresponding user pertaining to the desired analysis, and may provide reports including analysis results, such as power usage for an entity, projected power usage for an entity, optimal energy production sources, etc.

Power module 15 may include one or more modules or units to perform the various functions of present invention embodiments described herein. The various modules, such as intake and data classification module 205, energy optimization module 208, triggering event module 215, adaptation module 220, and feedback module 225, etc., may be implemented by any combination of any quantity of software and/or hardware modules or units, and may reside within memory 17 of the server and/or memory 24 of the client/crowdsourced systems for execution by processor 16 and/or processor 22 of the client/crowdsourced systems.

Intake and data classification module 205 may parse and classify data involving power usage and energy production. The data may be in any suitable format including image, html, xml, json, jpeg, pdf, word, text, and so forth. For documents that are not text readable, the system may perform optical character recognition on the documents in order to obtain the desired information. Imported information may be classified according to a suitable power classification schema within the power usage system, based on geographic location, entity characteristics, power source type, origin of data, etc. In some cases, historical or retrospective power usage data for a time interval may be obtained from a utility company or other entity, and may include power usage data for a zip code, a city, a county, etc., or from individual(s) via crowdsourcing. In other aspects, power usage data may be obtained from a power sensor, such as within a power meter, at a location, such as an individual residence, a corporate location, a campus, a power sensor attached to power infrastructure, a power sensor at a power distribution site, etc.

Energy optimization module 208 may be used to improve and optimize power generation and power usage. ECOH model 210 may utilize various types of inputs corresponding to power generation and power usage, such as demographic data, a time interval, energy production sources and associated parameters, energy infrastructure, along with entity, location, and crowdsourcing data to determine an optimal energy production source. ECOH model 210 may comprise or otherwise have access to power source type models 211, which include model(s) for different types of power sources. Power source type models may include a wind model, a solar model, a geothermal model, a tidal model, etc. An example of these types of models is described in further detail below. Harvesting module 212 may determine when excess power is produced by the entity, and may initiate a process in which the excess power is provided to a utility company for resale.

Triggering event module 215 may detect an event that may impact a particular energy production source, which is optimized for a location and an entity. Events may include transition from daytime to nighttime or vice-versa, from loss of power from an energy production source, from increased power usage, from decreased power usage, etc. Adaptation module 220 may provide a recommendation, such as switching to a different power production source, to mitigate the detected triggering event.

Feedback module 225 may provide actual power generation and power usage data to energy optimization module 208, wherein the actual data may be compared to prospective power usage and energy production estimates at the time the energy optimization module 208 is used to identify an optimal energy production source. This data may be used to refine and update power source type models 211 of ECOH model 210.

Figure 2:
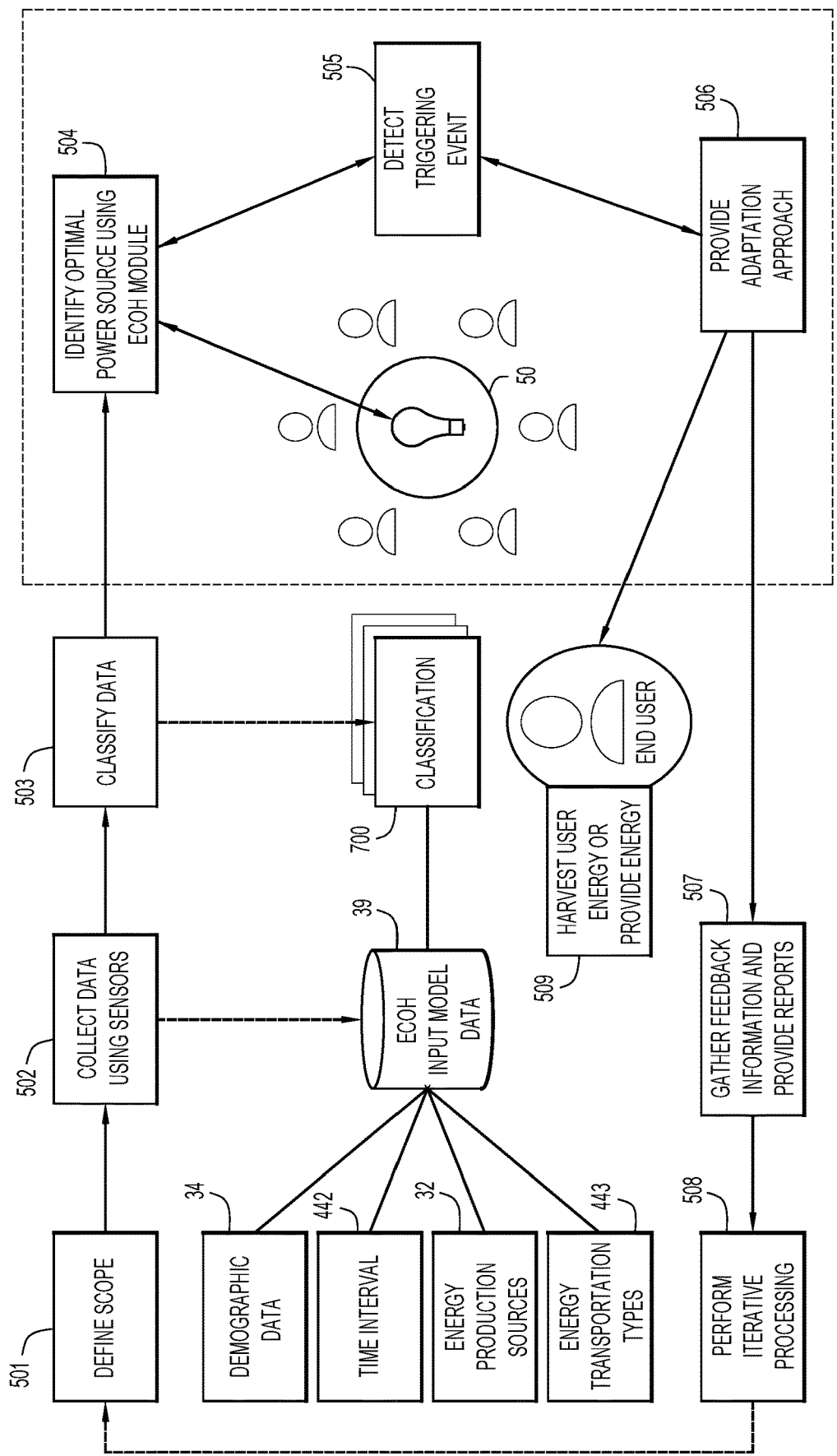
FIG. 2 is an illustration of an example system for energy production and consumption, according to embodiments of the present disclosure.

FIG. 2 is an illustration showing operations for power module 15. At operation 501, the power module may be configured to accept various types of input data for analysis. For example, the power module may consider input data including types of energy production sources 32, such as solar energy, wind energy, geothermal energy, hydrogen energy, tidal energy, wave energy, hydroelectric energy, biomass energy, etc., and associated parameters, such as production rate of energy for a source based on historical data, crowdsourcing data, or data provided from power sensors, a number of energy production sources in a location, energy transportation types/infrastructure 443, etc.

Power module 15 may also consider time intervals 442, including temporal time, such as minutes, hours, days, weeks, months, years, etc., time of day, such as daytime, morning, evening, night, etc., or custom times, such as high usage times, morning rush hour, evening rush hour, sporting or other events, etc. Different intervals of time may correlate with different usage patterns. For example, peak usage times during the week may correlate with morning and evening rush hours, while peak usage times on the weekends may correlate with sporting or other events. Historical data may be considered to identify peak usage times as well of annual events.

Other inputs may include demographic data 34 such as geographical location, types of energy available based on a geographical area, population density, and economic/industrial factors. For example, an auto manufacturing plant may have a much higher rate of energy usage than an equivalently sized office space. Population dense areas may have greater power usage than less dense areas. In some aspects, different types of energy infrastructure may be considered, including, but not limited to underground connections, ground connections, and aerial routes, including cables, wires, pipes, satellite, wireless, etc.

Once the scope of the inputs are defined, data may be stored in ECOH input model data 39, at operation 502, for usage by the ECOH model 210 during operation 504. For instance, sources of power usage and energy production data may include power sensors, including private sensors and public sensors, data from crowdsourcing, and historical data. For public or private power sensors connected directly to the power grid, data collection may occur on an ongoing basis, such as periodic, near real-time, real time, etc.

In some cases, power usage and energy production data may be publically available, such as bulk energy usage for a community, region, state, country, etc. as reported by a power company from power sensors 70 or from historical data. In other cases, power usage data may include private sources of data from individuals allowing an application capable of communication with the power module 15 to report power usage and energy production along with other characteristics of power sensors 70 or from public power sensors. Crowdsourced data may include data from entities reporting power usage and energy production for a location, etc. For example, if public or private sensor data is not available from power sensors 70, then a crowdsourcing option allowing users to self-report usage may be available, such as though a website, application, etc. In other cases, power data collection at operation 502 may be based on historical averages, such as power usage for a region during a particular month, or power usage for a region based on a temperature, etc.

In other cases, data collection may include power loss events, such as power loss over a specific area, planned power outages, etc., which may be helpful in rapidly identifying areas in need of additional power.

In some aspects, the power system 15 displays power usage and demand graphically, for example, with a gray or color scale mapping to identify low usage and high usage regions or locations.

Once the power usage information has been collected, it may be classified at operation 503 into different categories 700 for storage in database 30. For example, power sensor data may be collected for a variety of zip codes, and this information may be entered into records of the database. In other aspects, private sensor data may be collected for individuals in various zip codes, and this information may be entered into records of the database. In still other aspects, historical data and/or crowdsourcing data may be entered into records of the database.

In some cases, and with reference to power source type models 211, the power usage or energy production data may be used to extrapolate power characteristics over a region. For example, crowdsourced data for individuals living in a particular zip code may be used to extrapolate power usage for the entire zip code, for example, by determining the mean, average, etc. of the power usage or energy production data per individual or entity and scaling by the population. In other cases, average or mean power usage per person may be determined by scaling bulk power data based on population of the region. Similar operations may be performed to determine energy production. Using this approach, ECOH model 210 may determine power usage per zip code, power usage per entity, etc. Energy production data may also be categorized based on power source type. In some aspects, data collection may be ongoing, with collected power usage and energy production data stored in records in database 30. The power module 15 may store the data for later analysis in the database 30.

The ECOH model 210 may be used to access records in the database to perform various power computations at operation 504. For example, the ECOH module may access the data in the database to perform computations, such as energy usage per entity, energy usage per energy source, projected/prospective energy usage of an entity, identification of optimal energy production sources for an entity at a location, available energy sources at a location or region, produced energy at a location available for harvesting, etc. In some cases, when there is an excess of produced energy, this energy may be distributed within a designated area in response to the entity having a surplus of produced energy.

In some aspects, the ECOH model 210 via power module 15 may receive a query pertaining to an energy usage question, such as for an individual, a group of individuals, an organization, a geographical area, a city, a county, a state, a country, etc., and may determine the best energy production source based on optimization assumptions. For example, the ECOH module may be provided inputs, including at least a location, available energy sources, entity information, and a time interval, and the ECOH model will return a list of optimized energy production sources based on these optimization assumptions using power source type models 211.

For example, the ECOH model 210 may receive a request to compute optimal sources of energy for an entity at a geographic location. For an entity at a specified address, the system may determine possible energy sources in the area, such as electric, gas, wind, solar, geothermal, etc., and may evaluate each energy source to determine which source is optimal for the geographic location. For example, if the entity is in an area that receives high levels of sunlight, such as a desert area, then solar energy may be an optimal option. If the entity is in a windy area with high levels of annual rainfall, then the system may determine that wind is optimal to generate power.

As a further example, if a wind power source is available, the power source type models 211 may determine the amount of energy that the wind power source may produce using the following approaches: (1) generating prospective energy production data using sensor-based, crowdsourced data and/or historical data; or (2) if power data is not available, generating an estimate of energy production based on the amount of energy that one turbine is capable of generating multiplied by the number of turbines, and accounting for power loss due to various factors. This approach may be repeated for various types of energy production sources, in order to determine which source is optimal. Based on the power source type models 211, the amount of power being generated or capable of being generated for a particular geographical area can be determined using sensor data or in the absence of sensor data, estimates can be used.

In some cases, the ECOH module may consider historical power usage to determine if the amount of power needed at the location can be produced by the respective power source. For example, if a nearby entity, such as a neighbor, utilizes solar power, the system may determine based on private or crowdsourced sensor data, the amount of solar energy produced by the solar grid as a function of time. The system may compare the projected power needs of the present entity for a high usage time interval, to energy produced by nearby entities for a given power source. Thus, the ECOH module may determine which power source is optimal using retrospective data. Accordingly, the system may use recent, real-time data, near real time data, or historical data to make prospective determinations of power usage and energy generation.

The ECOH module may consider other demographic factors such as projected growth rates of a population to provide improved prospective power estimates. In some aspects, the ECOH module may determine for a geographical area that solar is an optimal power source based on today's data, but when considering future growth rates, the system may determine that wind provides a better option for increased power consumption in high growth areas.

In other embodiments, a power engineer may need to determine an optimal energy source for a new community. The power engineer may have the option of including wind and or solar farms in a particular geographic area near the new community. For example, the system may evaluate nearby entities that use these power sources, and may determine whether the amount of energy produced by the power source is sufficient to support the community. In this case, the projected power usage of the community may be compared to the energy produced by various energy options, such as solar panels, wind turbines, geothermal wells, etc., to determine the best energy source.

To determine an optimal energy production source, power module 15 may consider but is not limited to: the amount of power produced by the energy source, the amount of power needed at the location of the entity, whether existing infrastructure exists to support the power source, the projected cost of adding additional infrastructure and of implementing the power source, the projected population growth rates of the geographic area, historical/retrospective power trends for the geographic area, the number of generators for a power source, such as the number of solar panels, number of wind turbines, number of geothermal wells, etc.

Additionally, as energy production loss is desired to be minimized, power sensors may be optimally configured for power production and distribution. In some aspects, the system may identify when a power source produces more power than is needed by the entity. In such cases, the entity may receive a notification regarding the excess power, and may be provided with an option as to whether to offer the excess power to a power company for resale and/or redistribution. In some cases, a user may revert excessive energy production to a local, state, or multi-state power grid. In other cases, the local production of energy may be distributed locally, such as within a geo-fenced area.

ECOH model 210 may also update power source type models 211 based on newer information, such as wind patterns, tidal flow, temperature specific data and averages, etc., as more recent data becomes available to reflect changing environmental conditions. For projected energy usage of a given geographical area, the system may receive feedback of actual energy usage or production, which may be used to update existing power source type models 211.

For crowdsourced applications, tagging of events may be enabled to allow users to tag events corresponding to energy production. For example, certain events, if known within the context of energy production events, can be identified. Events such as large storms may provide high winds, which may greatly increase energy production. Such events may skew typical energy production data, especially on short timescales of days, weeks or even months. Thus, in some aspects, it may be desirable to tag such events to allow for filtering of event anomalies. In general, tagging energy production content to indicate an energy production source may be used for any suitable event, and is not limited to weather events.

In order to prevent false or misleading data from being incorporated into the system as part of crowdsourcing, verification of the event may be enabled. For example, in some cases, an administrator of the power module 15 may validate the reported event, or the number of reported events may need to exceed a predetermined threshold before the power module 15 incorporates the crowdsourced data into the ECOH module.

Various triggering events may be detected at operation 505, which may lead to a switch to a different power source, as recommended by the adaptation module, when multiple power sources are available. Examples of triggering events include but are not limited to events such as energy production surges due to weather or other anomalous event, energy usage surges due to increased load, energy loss due to power outages, damaged power source equipment, etc.

Temporal events may cause a switch of a selected power source, such as a switch from solar energy used during the day to other energy sources utilized at night.

The system may detect these triggering events, and at operation 506, the adaptation module 220 may provide compensatory changes. For example, if an energy usage surge is detected in a geographical area, the system may switch to another power source or may activate additional power sources, such as wind or solar, etc. In some cases, the system may undergo a failover event to a different type of energy production based on the time of day or night. As another example, the system may dynamically switch to/from wind power due to a pending storm.

As another example and in reference to crowdsourcing, if the energy production of local point 'A' is less than the crowdsourced average of locations near to local point 'A', the system may determine that the crowdsourced average source for energy production is more accurate, and may overwrite or update one or more power source type models 211 for the energy production of local point 'A'. In some aspects, the crowdsourced average energy production per individual is compared against the average energy production for all users for the locally based geographic area or geo-fenced area. The crowdsourced average rate of energy production for a power source may be determined by data recorded by the system, such as by averaging the energy production rate for a large number of users, using a cloud storage approach. A unique user historical power rate may be determined based on a typical rate at which the unique user begins producing energy by specific power source type. In other aspects, the system may compare a crowdsourced average power rate production per individual to a unique user historical power rate production. If there is a substantial difference, then the system may recommend an adjustment, such as inspection of the power equipment, sensors for malfunction, update of the power source type models 211, etc.

At operation 507, data to be used for feedback purposes may be gathered, and optionally provided as part of a report to the user. In some aspects, machine learning may be used as part of operation 507. For example, as data is generated, a machine learning approach may be used to optimize the power source type models of ECOH model 210 based upon obtained data. In some aspects, machine learning may be used to select cohort entities with similar characteristics to the entity for which optimization is desired.

At operation 508, the feedback data along with any other new information may be used to update the power source type models 211 iteratively, allowing for more accurate power source type models 211 to be generated and used. For example, the power source type models 211 of ECOH model 210 may be continuously updated, based on new power usage and/or energy production data, to reflect changes and improvements in power technology, to reflect environmental changes, and new types of renewable energy resources. The ECOH model 210 may also continuously update energy loss parameters of the power source type models 211 that reflect excess energy produced and not utilized to reflect recent performance trends.

Figure 3:
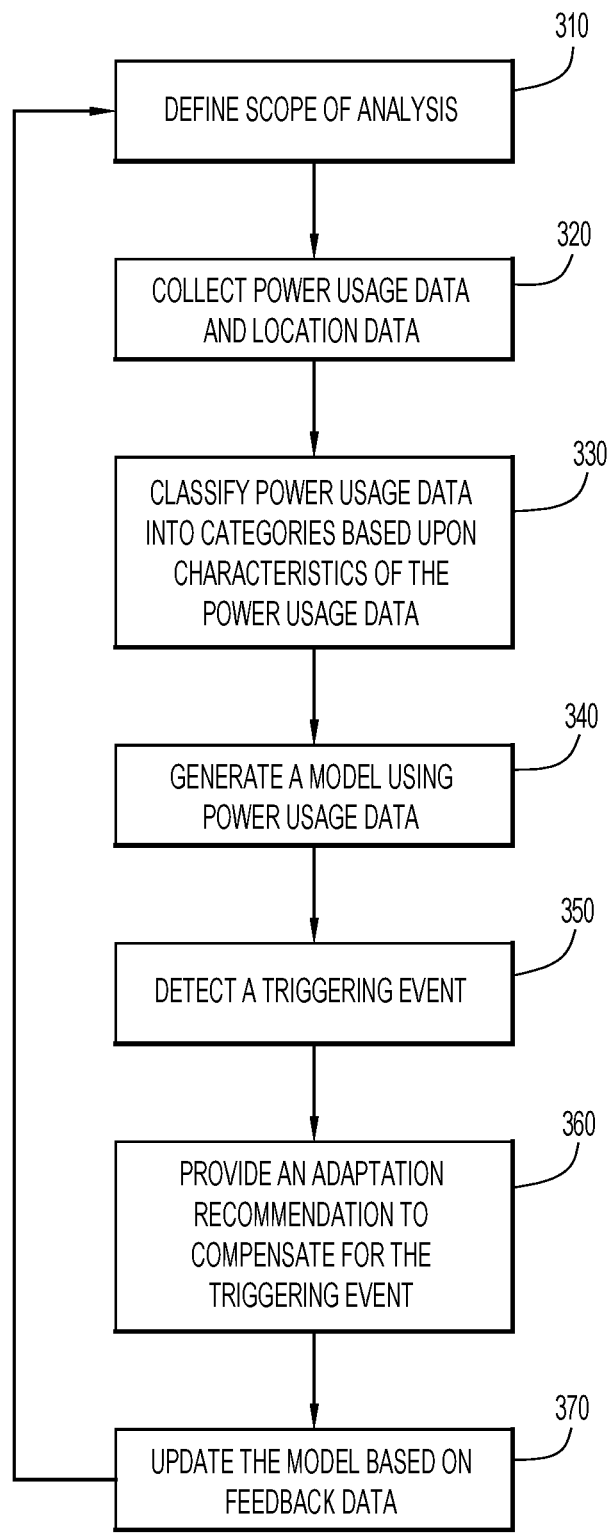
FIG. 3 is a flowchart of example operations for energy production and consumption, according to embodiments of the present disclosure.

FIG. 3 shows operations associated with FIG. 2 without crowdsourcing for power usage and harvesting. At operation 310, the scope of the analysis is defined.

At operation 320, the system collects power usage data and location data. For example, this may include individual usage data, bulk usage data of a group, etc. The system may correlate this information with location, in order to build power usage into power source type models 211 for individuals, groups, area codes, etc. Additionally, inputs may also include the types of power sources available. Additionally, if neighbors in proximity to an individual are using a particular type of energy source, such as a solar panel, information may be collected for later analysis, via power sensors, regarding actual usage statistics of an energy source in a nearby area.

Operation 330 may classify power usage data into categories based upon characteristics of the power usage data. For example, individual power usage data may be grouped together and subcategorized based on location, power source type, etc. Bulk power data may be grouped together, and subcategorized based on location, power source type, etc.

Alternatively, power data for a given type of power source may be grouped. For example, for solar power, data from individual and bulk data sources may grouped together, in some cases with subcategories, to capture differences in location and/or group size. In some aspects, individual data may be de-identified to remove identifying information and combined with bulk data sources.

At operation 340, power source type models 211 are generated (or updated) using power usage data from particular power sources at (different) locations. The power source type models 211 may also include a time interval, available power sources, historical and/or power sensor data, and so forth, in order to perform simulations to identify conditions for optimal usage in response to specific criteria. The ECOH module may also estimate excess energy production on days in which more power is produced than consumed. For example, power sources, such as thermal, wind, etc., may be connected to a nearby power grid, and may produce energy which may be sold to electric companies for distribution.

At operation 350, a triggering event is detected. A triggering event has the potential to cause a different energy source to be selected. For example, at dusk, a solar panel may not produce a sufficient amount of energy to maintain household operation. Therefore, and at operation 360, the power module 15 may provide an adaptation recommendation to compensate for the triggering event.

Once the power source type models 211 are implemented and used to determine generation and usage statistics for a particular location, actual data may be obtained for the selected power source. The actual data may be provided to the ECOH module to improve power source type models 211 accuracy.

Figure 4:
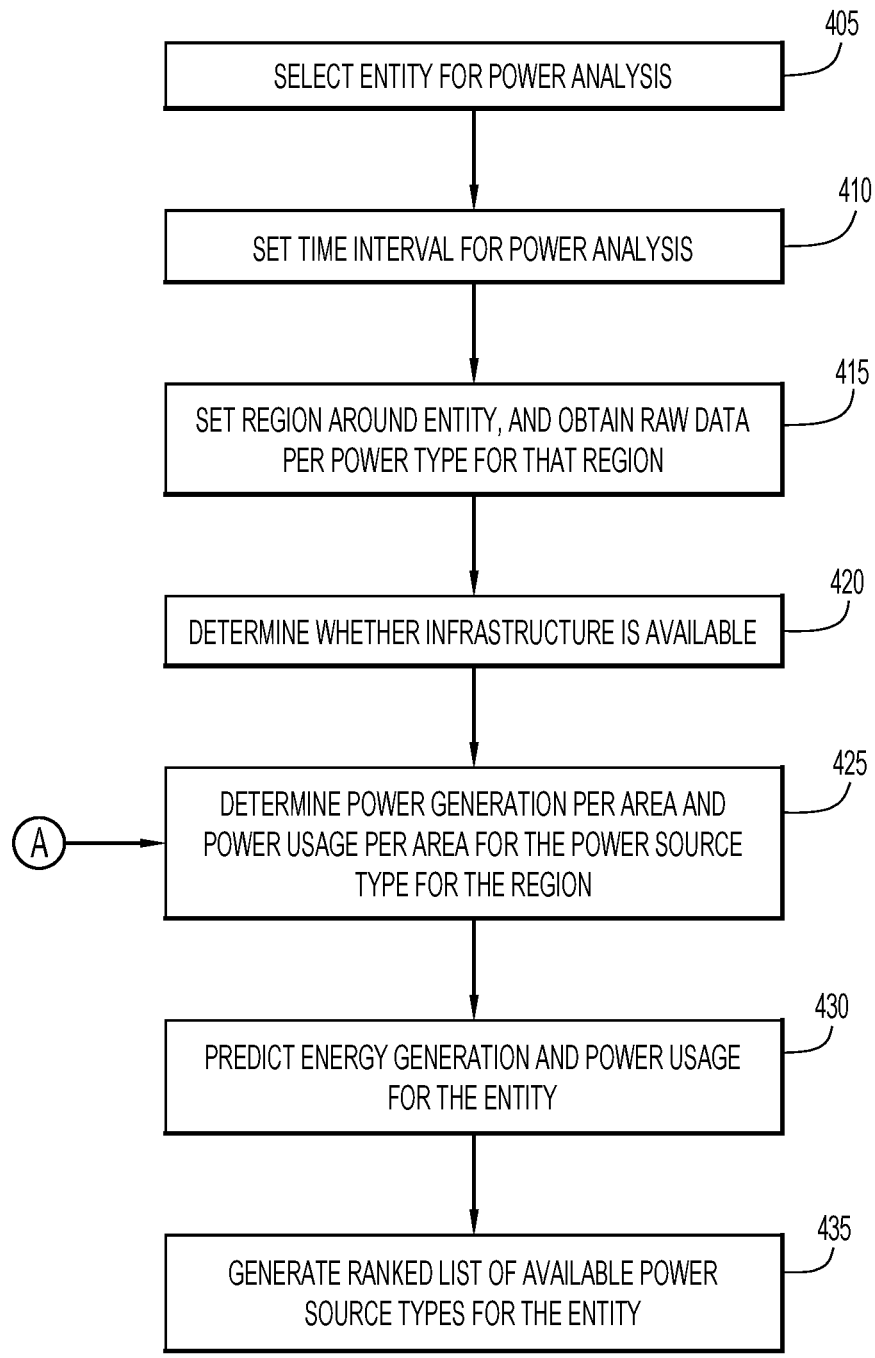
FIG. 4 is a flowchart showing example operations for determining power generation of a power source type and power usage for an entity, according to embodiments of the present disclosure.

FIG. 4 shows an example flow chart of operations performed by a power source type model 211. An entity may be selected at operation 405. The entity may be associated with an address, a zip code, a company, a campus, or other feature associated with a location. At operation 410, the time interval for the power analysis is set. The time interval may be set to a month, a quarter, six months, or a year. Longer or shorter time intervals or custom intervals may be selected as well.

At operation 415, a region is set around the entity. Any suitable shape may be selected, such as a square, a circle, an oval, a polygon, etc. In some aspects, the region may be set in terms of miles from the entity, such as a 5 mile radius, a 10 mile radius, a 20 mile radius, or larger. In other aspects, the region may be established within a proximity of the entity, and the region may be uniformly expanded until meeting a metric, such as encompassing a predetermined number of sensors or crowdsources that provide power usage and energy generation data to the power source type models 211.

At operation 420, the system may determine whether infrastructure is available for the power source type. If sufficient infrastructure is not available and the power source type is associated with expensive infrastructure, the power source type may be omitted from further consideration. The user interface 28 may contain options to set which power source types are included or excluded.

At operation 425, power source type models may determine a power generation per area value for each power source type, based upon the time interval and energy generation data from the region. The power generation per area value may be determined for each power source type and the results may be compared to identify an optimal power source type or combination.

For example, the power generation per area value for solar energy may be determined based upon energy production for other similarly sized entities within the region. A user may wish to determine an optimal power source type for a 4,500 sq ft building over a three month period. A region may be selected, such as a 10 mile radius, and other buildings of a similar size, such as buildings between about 4,250 sq ft to about 4,750 sq ft, may be identified for inclusion in the analysis. In some cases, power sensors or crowdsourcing may provide power generation/usage metrics for solar energy for the identified buildings. In other cases, historical power generation/usage data may be obtained from a utility company for the identified buildings. The energy generation for solar energy in this timeframe may be normalized based on the size of the building to generate a power generation per sq ft value. This may be repeated for all buildings falling within the specified size range, and the normalized values may be combined to determine an overall power generation per sq ft value for the similarly sized buildings within the region. Similarly, a power usage per sq ft value for similarly sized buildings within the region may be determined.

In other embodiments, a power generation per area value may be determined for all buildings falling within a region, regardless of their size. Power generation may again be normalized based on size, and combined to generate an overall power generation per sq ft value for all buildings of all sizes within a region. Similarly, a power usage per sq ft value for all buildings of all sizes within the region may be determined.

At operation 430, the determined power generation per area and determined power usage per area for the region, determined from operation 425, may be used to predict energy generation and power usage for the entity. For example, the power usage per sq ft value for a region may be multiplied by the square footage of the entity to arrive at a predicted power usage value for the entity. In other cases, the predicted power usage value for the entity may be based upon historical data, if available, for the entity. Similarly, a predicted energy generation per sq ft value for the entity may be determined by multiplying the square footage of the entity by the energy generation per sq ft value from operation 425 to arrive at a predicted energy generation value for the entity.

In some cases, a power efficiency metric reflecting the efficiency of the solar cells, efficiency of the wind turbine, etc. may be obtained from the historical data, from power sensors or from crowdsourcing, and may be provided to the power source type model 211, which may be used to determine predicted power usage and energy generation. Similarly, a size setting to reflect the size of the solar panels or the number of turbines, etc. of the entity may be obtained and provided to power source type model 211. For instance, for the entity, if the size of the solar panels and model number of the solar panels are provided to the power source type model 211, then the model can scale the energy generation value by a size of the solar panels and/or efficiency of the solar panels to obtain a more accurate value. For example, a typical solar panel size may be about 39" by 65". If within the region, other entities use about 10 solar panels, and the entity will use 20 solar panels, then the energy generation value for the entity may be approximately double of the other entities within the region.

The predicted energy generated for each power source type may be determined, and a ranked list provided at operation 435. The power module 15 may identify which power source types are sufficient to power the entity. If the predicted energy generated for each power source type falls below the predicted power usage for the entity, a hybrid approach may be recommended.

In this example, by considering regions (containing other entities) proximal or local to the entity, geographical variations in the availability of a particular type of power source may be accounted for. For example, a region corresponding to an entity in the desert may generate much more power from solar energy than another region corresponding to an entity in a forest that receives frequent rainfall.

Figure 5:
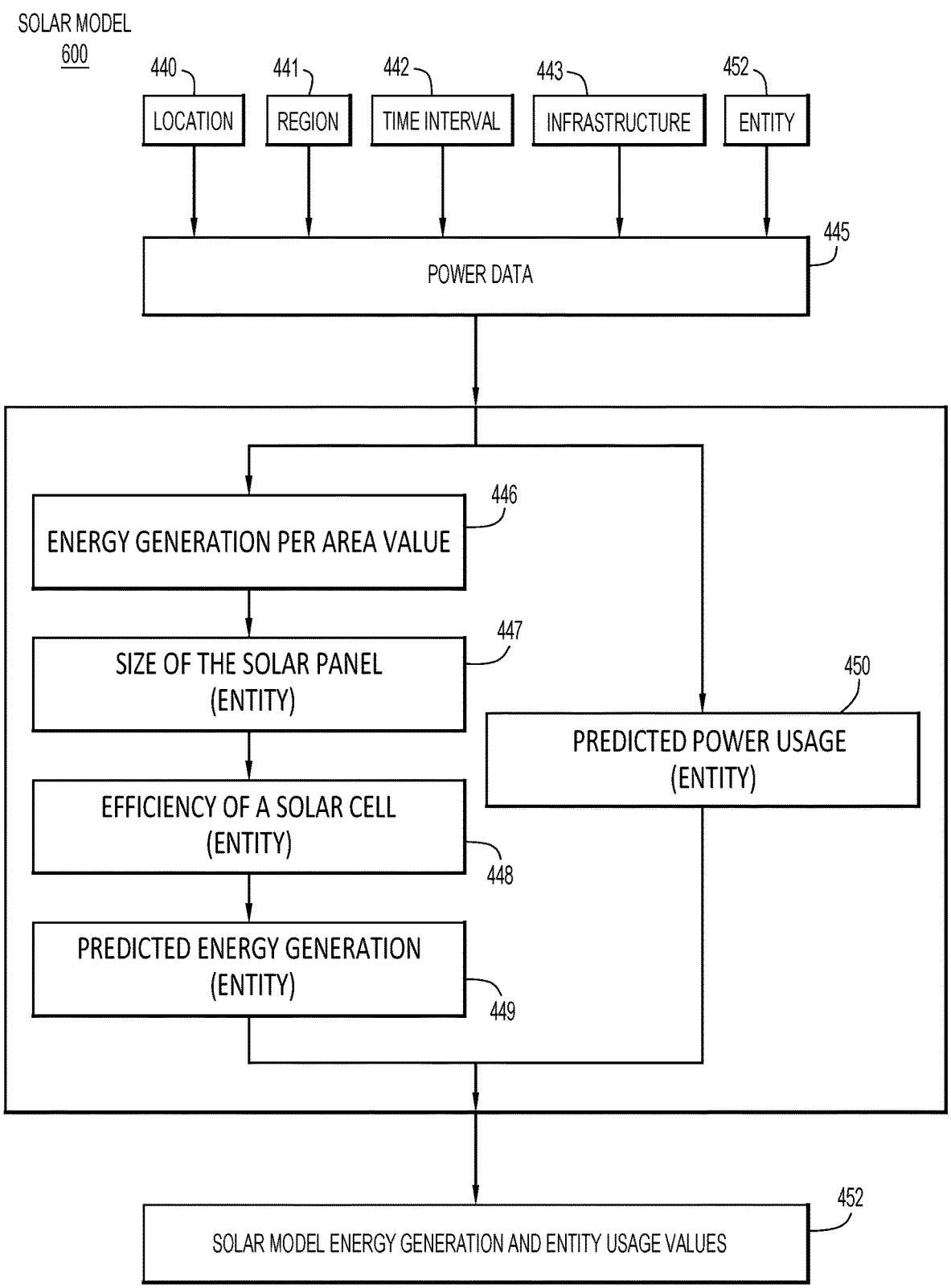
FIG. 5 is an illustration showing an example model for a power source type, according to embodiments of the present disclosure.

FIG. 5 shows an example of a power source type model, in this case, a solar model 600. Location 440, region 441, and time interval 442 parameters may be used to select corresponding power data 445, which may include power usage data, crowdsourced data, and energy production data, to provide to the solar model. In some cases, infrastructure/ energy transportation types 443 may be provided to eliminate from consideration costly solutions without adequate infrastructure. The solar model may then analyze the power data with reference to operation 425 to predict energy generation and power usage for the entity.

For example, an energy generation per area value 446 may be determined, and this value may be used to predict solar energy production 449 for solar panels installed at the entity. In some embodiments, the model 600 may account for the size of the solar panel 447 and efficiency of the solar cells 448 of the entity, if this information is known. Additionally, the solar model may compare the predicted power usage 450 for the entity to the predicted power generation of the entity, to determine whether solar energy is sufficient to meet the predicted power needs of the entity, as reflected in solar model energy generation and entity usage values 452. If the solar panels do not produce enough energy, a hybrid approach may be considered. Similar models may be developed for thermal, tidal, etc., types of power sources, and ECOH model 210 may aggregate and rank the results to be provided to a user.

While this example pertains to an entity and its local environment or region, present invention embodiments may also include management of power between entities over larger distances. For example, if an entity is a zip code or county, and surrounding or near by zip codes or counties have an excess of generated energy, the extra energy may be offered to a utility company for distribution to the zip code needing additional power.

Figure 6:
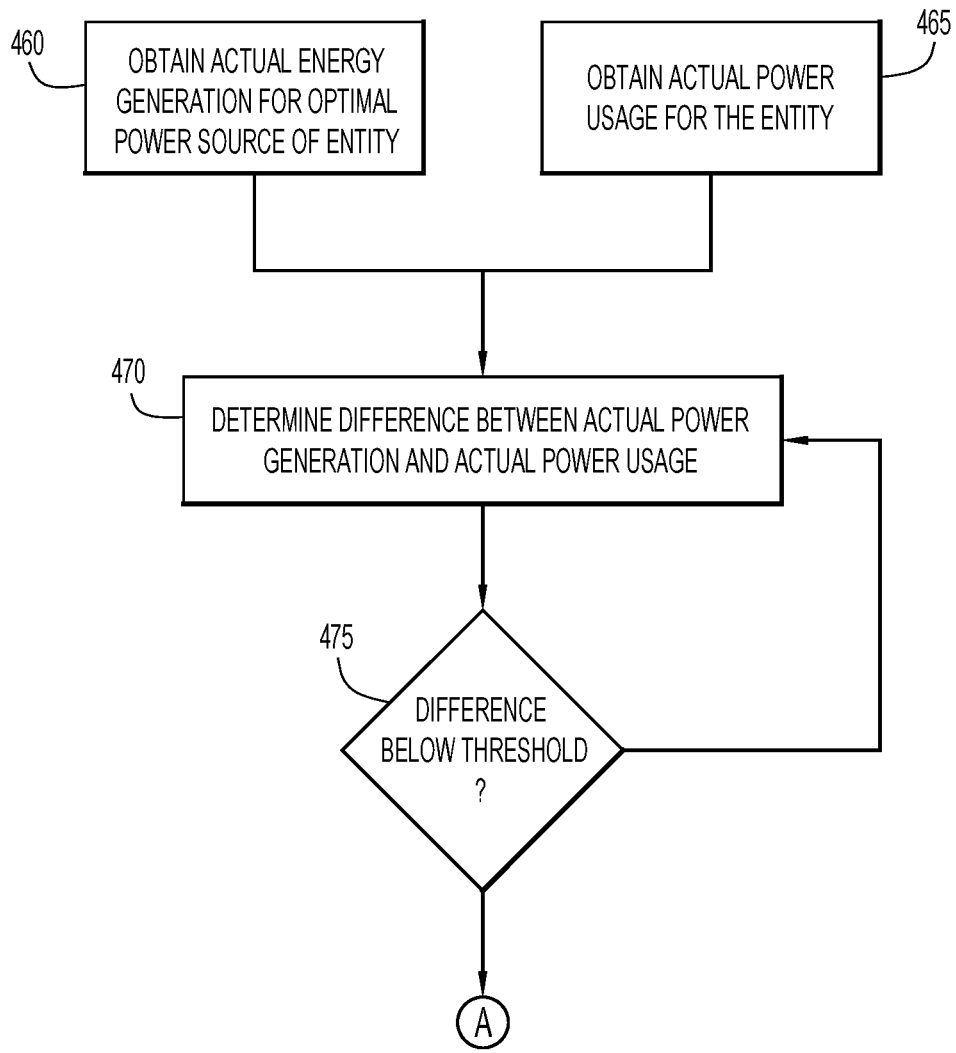
FIG. 6 is a flowchart showing example operations for detecting a triggering event, according to embodiments of the present disclosure.

FIG. 6 shows a flowchart of operations corresponding to trigger event module 215. At operations 460 and 465, the actual energy generation for the optimal power source at the entity is obtained along with the actual power usage for the entity. At operation 470, trigger event module 215 determines the difference between the actual energy generation and the actual power usage of the entity. If the difference is greater than a threshold, then the system returns to operation 425 to update power usage and energy generation predictions. Otherwise, the system continues to monitor the actual energy generated and the actual power usage to detect power deviations.

This example compares actual energy generated to actual power usage. However, other comparisons may be performed to detect a triggering event, such as comparing the actual energy generated to the predicted energy generated, or predicted energy generated to actual power usage, etc. If the differences between these values are greater than a threshold, then the system returns to operation 425 to update power usage and energy generation predictions. For example, if weather, atmospheric conditions, or other factors cause interruptions in energy generation or power outages, triggering event module will detect these events, and may employ other power sources to compensate for the interruption or outage. Otherwise, the system continues to monitor power usage and energy generation to detect power deviations. For example, Table 1 shows sample values corresponding to crowdsourced values for different power source type models including wind, solar, and hydrothermal. Individual values for the entity are shown below. For user A, wind, solar and hydrothermal are determined for a period of time. In this example, the higher the value, the more energy that is produced by the user. This model is an iterative model, populated for a group of users, and repeats at a predefined time interval, for a particular geographic location. In the example below, shown in Table 1, user A data supports the crowd sourced average data as well.

TABLE 1

| | Starting Baseline | Finishing Baseline | Delta | Relative Weight of the Option |
|---|---|---|---|---|
| Wind Power - Crowd Average | 0 | 225 | | |
| Solar Power - Crowd Average | 0 | 122 | | |
| Hydrothermal Power - Crowd Average | 0 | 153 | | |
| USER A - Wind | 346 | 545 | 199 | <<<---- Wind power would be best option |
| USER A - Solar | 745 | 865 | 120 | <<<---- Solar would be 3rd option |

TABLE 1-continued

| | Starting Baseline | Finishing Baseline | Delta | Relative Weight of the Option |
|---|---|---|---|---|
| USER A - Hydrothermal | 224 | 367 | 143 | <<<---- Hydrothermal would be 2nd option |

Figure 7:
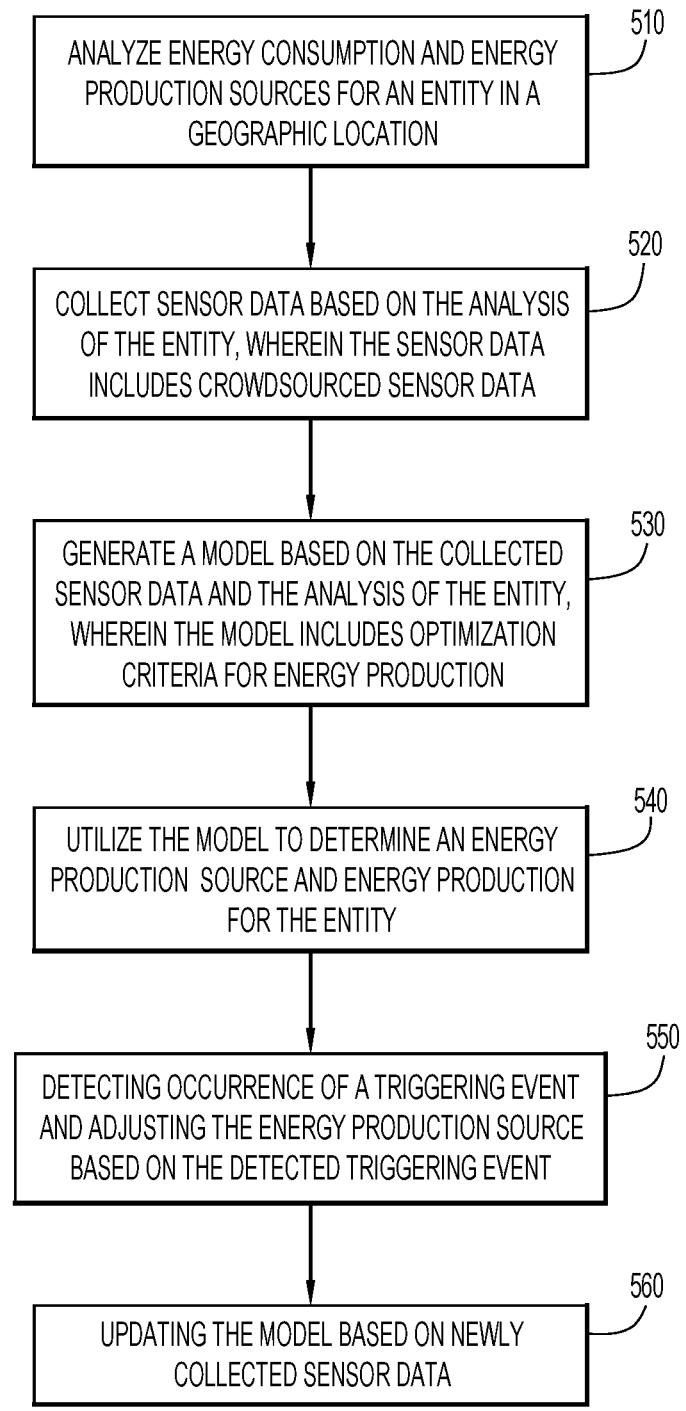
FIG. 7 is a high level flowchart of example operations for energy production and consumption, according to embodiments of the present disclosure.

FIG. 7 shows a flow chart of operations for producing energy from one or more energy production sources. At operation 510, energy consumption and energy production sources for an entity in a geographic location are analyzed. At operation 520, sensor data based on the analysis of the entity is collected, wherein the sensor data includes crowdsourced sensor data. At operation 530, a model is generated based on the collected sensor data and the analysis of the entity, wherein the model includes optimization criteria for energy production. At operation 540, the model is utilized to determine an energy production source and energy production for the entity. At operation 550, occurrence of a triggering event is detected, and the energy production source is adjusted based on the detected triggering event. At operation 560, the model is updated based on newly collected sensor data.

Advantages of present techniques include: (1) evaluating energy usage and energy production and harvesting in a geographic location on an individual by individual basis; (2) providing power source type models 211 as part of ECOH model 210, derived from prior analysis and collected data, in conjunction with (3) an adaption module to compensate for events impacting energy generation and consumption; and (4) allowing users with a surplus of energy to donate to local (geo-fenced) or national grids.

Thus, the system may use sensors to measure power generation and usage under changing conditions, and may dynamically switch power sources to meet evolving power generation and usage demands. Additionally, the system may control aspects of distribution of power over a network.

It will be appreciated that the embodiments described above and illustrated in the drawings represent only a few of the many ways of implementing embodiments for identifying optimal power sources for a geographical area.

The environment of the present invention embodiments may include any number of computer or other processing systems, such as client or end-user systems, server systems, etc., and databases or other repositories arranged in any desired fashion, where the present invention embodiments may be applied to any desired type of computing environment, such as cloud computing, client-server, network computing, mainframe, stand-alone systems, etc. The computer or other processing systems employed by the present invention embodiments may be implemented by any number of any personal or other type of computer or processing system, such as desktop, laptop, PDA, mobile devices, etc., and may include any commercially available operating system and any combination of commercially available and custom software, such as browser software, communications software, server software, power module 15, etc. These systems may include any types of monitors and input devices, such as keyboard, mouse, voice recognition, etc., to enter and/or view information.

It is to be understood that the software, such as power module 15, including intake and data classification module 205, energy optimization module 208 triggering event module 215, adaptation module 220, and feedback module 225, etc., of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as LAN, WAN, Intranet, Internet, hardwire, modem connection, wireless, etc. For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments, such as power module 15, including intake and data classification module 205, energy optimization module 208, triggering event module 215, adaptation module 220, and feedback module 225, may be available on a non-transitory computer useable medium, such as magnetic or optical mediums, magneto-optic mediums, floppy diskettes, CD-ROM, DVD, memory devices, etc., of a stationary or portable program product apparatus or device for use with stand-alone systems or systems connected by a network or other communications medium.

The communication network may be implemented by any number of any type of communications network, such as LAN, WAN, Internet, Intranet, VPN, etc. The computer or other processing systems of the present invention embodiments may include any conventional or other communications devices to communicate over the network via any conventional or other protocols. The computer or other processing systems may utilize any type of connection, such as wired, wireless, etc., for access to the network. Local communication media may be implemented by any suitable communication media, such as local area network (LAN), hardwire, wireless link, Intranet, etc.

The system may employ any number of any conventional or other databases, data stores or storage structures, such as files, databases, data structures, data or other repositories, etc., to store information, such as energy production sources 32, demographic data 34, power usage data 36, and crowdsourced data 38, ECOH input model data 39, etc. The database system may be implemented by any number of any conventional or other databases, data stores or storage structures, such as files, databases, data structures, data or other repositories, etc., to store information, such as energy production sources 32, demographic data 34, power usage data 36, and crowdsources data 38, etc. The database system may be included within or coupled to the server and/or client systems. The database systems and/or storage structures may be remote from or local to the computer or other processing systems, and may store any desired data, such as energy production sources 32, demographic data 34, power usage data 36, and crowdsourced data 38, ECOH input model data 39, etc.

The present invention embodiments may employ any number of any type of user interface, such as Graphical User Interface (GUI), command-line, prompt, etc., for obtaining or providing information, such as such as energy production sources 32, demographic data 34, power usage data 36, and crowdsourced data 38, ECOH input model data 39, etc., where the interface may include any information arranged in any fashion. The interface may include any number of any types of input or actuation mechanisms, such as buttons, icons, fields, boxes, links, etc., disposed at any locations to enter/display information and initiate desired actions via any suitable input devices, such as mouse, keyboard, etc. The interface screens may include any suitable actuators, such as links, tabs, etc., to navigate between the screens in any fashion.

The report may include any information arranged in any fashion, and may be configurable based on rules or other criteria to provide desired information to a user, such as local energy usage, excess energy production, optimal energy source, etc.

The present invention embodiments are not limited to the specific tasks or algorithms described above, but may be utilized for any application in which location specific power data is utilized, and may operate on any suitable scale, from a single residential level, to a community or city level, to a state or country level, and even a global level.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, such as light pulses passing through a fiber-optic cable, or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of producing energy from one or more energy production sources comprising:
    analyzing, via a processor, energy consumption and energy production sources for an entity, wherein the entity and energy consumption and energy production sources are proximal to each other in a geographical region;
    collecting sensor data based on the analysis of the entity, wherein the sensor data includes crowdsourced sensor data provided by users of one or more other entities of a crowdsourcing population self-reporting the crowdsourced sensor data, wherein the crowdsourced sensor data includes events tagged by the users that correspond to and skew energy production data, and wherein the sensor data comprises energy consumption and energy production data for the entity and for the energy consumption and energy production sources of the other entities within the geographical region;
    verifying, via the processor, the events tagged by the users based on a number of the events reported in the crowdsourced sensor data satisfying a threshold;
    filtering, via the processor, the crowdsourced sensor data based on the verified events to filter event anomalies;
    generating, via the processor, a model based on the collected sensor data, a projected population growth rate for the geographical region, and the analysis of the entity, wherein the model includes optimization criteria for energy production and models types of energy production based on one or more from a group of wind patterns, tidal flow, and temperature specific data and averages;
    excluding, via the processor, one or more of the energy production types from the model based on availability and cost of infrastructure to support the one or more energy production types;
    utilizing the model, via the processor, to:
        determine energy production and energy consumption for the energy production sources for the geographical region;
        update the model based on the crowdsourced sensor data in response to a crowdsourced average for energy production greater than the energy production from the model;
        project an energy usage of the entity for a time interval based on the determined energy production and energy consumption;
        identify the energy production sources within the geographical region that are determined to meet the projected energy usage of the entity for the time interval based on the determined energy production and energy consumption; and
        select an energy production source within the geographical region from the identified energy production sources, wherein the selected energy production source includes the energy production source that is optimal for the projected population growth rate;
    detecting occurrence of a triggering event and changing a current energy production source to the selected energy production source within the geographical region based on the detected triggering event;
    generating energy to the geographical region using the selected energy production source; and
    updating the model, via the processor, based on feedback data comprising actual power generation and power usage.

2. The method of claim 1, further comprising:
distributing produced energy of the entity within an area in response to the entity having a surplus of produced energy.

3. The method of claim 1, wherein analyzing the entity further comprises:
defining a scope for the model, wherein the scope includes one or more from a group of demographic considerations, a time interval for analysis, a type of energy production, and a type of energy transportation.

4. The method of claim 1, wherein the sensor data further includes public sensor data and private sensor data.

5. The method of claim 1, wherein the triggering event is based on a comparison of the energy production for the entity with a crowdsourced average of energy production.

6. The method of claim 5, wherein the detecting the occurrence of the triggering event further comprises:
recording an average energy production rate based on the crowdsourced sensor data;
determining a rate the entity produces energy by type or category based on power source type; and
comparing the average energy production rate to the determined rate and adjusting the current energy production source based on the comparison indicating a difference satisfying a threshold.

7. The method of claim 1, wherein the triggering event includes one of a temporal event and an atmospheric event.

8. A system for producing energy from one or more energy production sources comprising at least one processor configured to:
analyze energy consumption and energy production sources for an entity, wherein the entity and energy consumption and energy production sources are proximal to each other in a geographical region;
collect sensor data based on the analysis of the entity, wherein the sensor data includes crowdsourced sensor data provided by users of one or more other entities of a crowdsourcing population self-reporting the crowdsourced sensor data, wherein the crowdsourced sensor data includes events tagged by the users that correspond to and skew energy production data, and wherein the sensor data comprises energy consumption and energy production data for the entity and for the energy consumption and energy production sources of the other entities within the geographical region;
verify the events tagged by the users based on a number of the events reported in the crowdsourced sensor data satisfying a threshold;
filter the crowdsourced sensor data based on the verified events to filter event anomalies;
generate a model based on the collected sensor data, a projected population growth rate for the geographical region, and the analysis of the entity, wherein the model includes optimization criteria for energy production and models types of energy production based on one or more from a group of wind patterns, tidal flow, and temperature specific data and averages;
exclude one or more of the energy production types from the model based on availability and cost of infrastructure to support the one or more energy production types;
utilize the model to:
determine energy production and energy consumption for the energy production sources for the geographical region;
update the model based on the crowdsourced sensor data in response to a crowdsourced average for energy production greater than the energy production from the model;
project an energy usage of the entity for a time interval based on the determined energy production and energy consumption;
identify the energy production sources within the geographical region that are determined to meet the projected energy usage of the entity for the time interval based on the determined energy production and energy consumption; and
select an energy production source within the geographical region from the identified energy production sources, wherein the selected energy production source includes the energy production source that is optimal for the projected population growth rate;
detect occurrence of a triggering event and change a current energy production source to the selected energy production source within the geographical region based on the detected triggering event;
generate energy to the geographical region using the selected energy production source; and
update the model based on feedback data comprising actual power generation and power usage.

9. The system of claim 8, wherein the at least one processor is further configured to:
distribute produced energy of the entity within an area in response to the entity having a surplus of produced energy.

10. The system of claim 8, wherein the at least one processor is further configured to:
define a scope for the model, wherein the scope includes one or more from a group of demographic considerations, a time interval for analysis, a type of energy production, and a type of energy transportation.

11. The system of claim 8, wherein the sensor data further includes public sensor data and private sensor data.

12. The system of claim 8, wherein the triggering event is based on a comparison of the energy production for the entity with a crowdsourced average of energy production.

13. The system of claim 12, wherein the at least one processor is further configured to:
record an average energy production rate based on the collected crowdsourced sensor data;
determine a rate the entity produces energy by type or category based on power source type; and
compare the average energy production rate to the determined rate and adjust the current energy production source based on the comparison indicating a difference satisfying a threshold.

14. The system of claim 8, wherein the triggering event includes one of a temporal event and an atmospheric event.

15. A computer program product for a system for producing energy from one or more energy production sources, the computer program product comprising one or more computer readable storage media collectively having program instructions embodied therewith, the program instructions executable by a processor of the system to:
analyze energy consumption and energy production sources for an entity, wherein the entity and energy consumption and energy production sources are proximal to each other in a geographical region;
collect sensor data based on the analysis of the entity, wherein the sensor data includes crowdsourced sensor data provided by users of one or more other entities of a crowdsourcing population self-reporting the crowdsourced sensor data, wherein the crowdsourced sensor data includes events tagged by the users that correspond to and skew energy production data, and wherein the sensor data comprises energy consumption and energy production data for the entity and for the energy consumption and energy production sources of the other entities within the geographical region;

verify the events tagged by the users based on a number of the events reported in the crowdsourced sensor data satisfying a threshold;

filter the crowdsourced sensor data based on the verified events to filter event anomalies;

generate a model based on the collected sensor data, a projected population growth rate for the geographical region, and the analysis of the entity, wherein the model includes optimization criteria for energy production and models types of energy production based on one or more from a group of wind patterns, tidal flow, and temperature specific data and averages;

exclude one or more of the energy production types from the model based on availability and cost of infrastructure to support the one or more energy production types;

utilize the model to:
  determine energy production and energy consumption for the energy production sources for the geographical region;
  update the model based on the crowdsourced sensor data in response to a crowdsourced average for energy production greater than the energy production from the model;
  project an energy usage of the entity for a time interval based on the determined energy production and energy consumption;
  identify the energy production sources within the geographical region that are determined to meet the projected energy usage of the entity for the time interval based on the determined energy production and energy consumption; and
  select an energy production source within the geographical region from the identified energy production sources, wherein the selected energy production source includes the energy production source that is optimal for the projected population growth rate;

detect occurrence of a triggering event and change a current energy production source to the selected energy production source within the geographical region based on the detected triggering event;

generate energy to the geographical region using the selected energy production source; and update the model based on feedback data comprising actual power generation and power usage.

16. The computer program product of claim 15, wherein the program instructions are executable to:

distribute produced energy of the entity within an area in response to the entity having a surplus of produced energy.

* * * * *